United States Patent [19]
Moody et al.

[11] Patent Number: 5,759,319
[45] Date of Patent: *Jun. 2, 1998

[54] APPARATUS AND METHOD FOR ATTACHING FITMENTS TO CARTONS

[75] Inventors: Rodger A. Moody, San Jose; Gerald M. Blain, Los Gatos; Ronald J. Billet, Sunnyvale, all of Calif.

[73] Assignee: Portola Packaging, Inc., San Jose, Calif.

[*] Notice: The term of this patent shall not extend beyond the expiration date of Pat. No. 5,601,669.

[21] Appl. No.: 778,807

[22] Filed: Jan. 3, 1997

Related U.S. Application Data

[63] Continuation of Ser. No. 317,561, Oct. 4, 1994, Pat. No. 5,601,669.

[51] Int. Cl.$^6$ .................................................. B32B 31/16
[52] U.S. Cl. ................... 156/73.1; 156/580.1; 264/445; 425/174.2; 493/87; 493/213
[58] Field of Search .................. 156/69, 73.1, 580.1, 156/580.2; 264/442, 443, 445; 425/174.2; 493/213, 214, 929, 87

[56] References Cited

U.S. PATENT DOCUMENTS 5,484,374  1/1996  Bachner et al. ..................... 493/87
5,601,669  2/1997  Moody et al. ...................... 156/73.1
5,653,832  8/1997  Thompson et al. ................. 156/73.1

*Primary Examiner*—James Sells
*Attorney, Agent, or Firm*—Julian Caplan; Flehr Hohbach Test Albritton & Herbert, LLP

[57] ABSTRACT

A fitment comprising a pouring spout having a peripheral flange at one end and a closure at a second end is attached to a paperboard carton formed with a hole in a side panel. The carton is moved intermittently along a conveyor, such as that used in a filling machine. An arm having a spud oscillates about a horizontal axis parallel to the conveyor. The arm is pivoted to down position as the carton reaches the fitment attaching station so that the fitment enters the open end of the carton with the spud aligned with the carton hole. The arm is mounted on a first carriage which reciprocates horizontally in a first direction to project the closure through the hole until the flange abuts the inside of the carton panel. An ultrasonic welding horn is mounted on a second carriage which reciprocates in alignment with the first carriage in a second direction opposite the first direction. The horn welds the fitment flange to the inside of the carton panel.

15 Claims, 7 Drawing Sheets

APPARATUS AND METHOD FOR ATTACHING FITMENTS TO CARTONS

This application is a continuation of U.S. patent application Ser. No. 08/317,561, filed Oct. 4, 1994, now U.S. Pat. No. 5,601,669, issue Feb. 11, 1997.

BACKGROUND OF THE INVENTION

1. Field of the Invention

This invention relates to a new and improved method and apparatus for attaching fitments to cartons. More particularly, the invention relates to apparatus and method for ultrasonically welding a plastic fitment (comprising a pouring spout, flange at one end thereof and closure at the opposite end thereof) to a paperboard carton of the type used to package milk and other products. In accordance with the invention, the fitment is inserted into an open end of the carton into alignment with a hole formed in a wall of the carton, moved laterally until the closure end of the spout extends through the hole in the carton wall and the flange abuts the inside of the carton wall and then welded to the interior of the carton wall.

2. Description of Related Art

Fitments of the general types used with the present invention are known in the art. Examples of improved fitments of this type are shown in U.S. Pat. Nos. 5,174,465 and 5,249,695, owned by the assignee of this application, among others.

Paperboard cartons of the general type used in conjunction with the present invention are commonly used for packaging milk, juice, and other products. Heretofore flanges of fitments used with such cartons have been welded either to the inside or the outside of the walls of such cartons by ultrasonic welding.

An important advantage in using fitments on such cartons is that they facilitate dispensing the carton contents. Cartons which do not use such fitments require opening the upper end of the tent-type closure, which is a task of some difficulty.

SUMMARY OF THE INVENTION

In a preferred embodiment of the present invention apparatus is provided for attaching to a paperboard carton, in a condition of its fabrication wherein the upper end is open and the sides are erected in rectangular tubular form and wherein one wall is formed with a pre-punched hole, of a thermoplastic fitment having a spout formed with a peripheral flange at one end and a spout closure at the opposite end.

The apparatus of the invention is installed as one station on a paperboard carton filling line such as, for example, Tetrapak® TR6. The apparatus is mounted on a frame which is, in turn, mounted above a longitudinally intermittently moving carton conveyor on a transverse horizontal frame member of the machine.

Fitments are conveyed to a loading station which has an air-actuated cylinder which picks one fitment at a time off the terminus of a conveyor.

Mounted on the frame of the apparatus are two transverse horizontally spaced apart rods which serve as ways for other moving members of the apparatus. Reciprocating in a transverse horizontal direction on the rods is a first carriage to which is pivotly mounted an L-shaped arm. Mounted on an end of the arm is an anvil or spud which in the upper position (e.g., 35° above horizontal) of the pivoted L-shaped arm is positioned to receive the fitment as it is pushed out of the fitment terminus. The arm then is pivoted downwardly to a vertical position to enter the open end of a carton which is moved intermittently along the conveyor of the filler machine. The fitment is horizontally and vertically aligned with a hole in the carton wall. As the carton remains stationary, the first carriage or slide is moved on the ways so as to push the closed end of the fitment through the hole in the carton wall until a flange on the fitment engages the inside of the panel. At the same time an ultrasonic welding horn mounted on a second carriage is moved along the ways in a direction opposite the movement of the first carriage so that the horn engages the carton panel opposite the fitment flange and ultrasonically welds the fitment to the carton.

Conventionally, carton filling machines accommodate one or two filling lines — that is, two lines of cartons are moved longitudinally on separate conveyors parallel to each other. One of the features of the present invention is that space requirements are minimal so that two of the apparatus hereinafter described may be mounted end to end to accommodate both filling lines.

Accordingly, in accordance with the present invention, tubular rectangular cartons having at least one open end and formed with a hole in a side wall adjacent the open end are deposited on a conveyor in a filling line which carries the carton to a fitment insertion station where the fitment is positioned in the carton in alignment with the hole, moved so that the closure end of the fitment projects out through the hole, and the flange is welded to the inside of the carton.

A principal advantage of the present invention is the facility with which fitments may be inserted into the open end of the carton, positioned with the closure end of the fitment protruding out through the hole in the carton and the flange welded to the inside wall of the carton.

Another principal advantage of the present invention is that the machine may be installed in a carton filling machine so that the attachment of fitments occurs at the same dwell time as the cartons are filled. Accordingly the present invention requires little or no alteration or timing adjustment of conventional filler machines with which it is used even when the speed of the filler is changed by the operator.

One important advantage of this invention is that the carton may be erected and a fitment welded thereto with minimal modification of a standard filler.

The present invention makes it possible to attach fitments to cartons more rapidly, thereby making the production of fitment-attached cartons more economical and thus more generally available to the public. The apparatus is installed at a station in the filling line. It requires little space and hence does not require major modification of the filling line and does not retard the speed of operation of the line.

Modern fillers use filtered air to reduce contamination of the carton. Another advantage of the present invention is that the apparatus does not contaminate the filtered airspace of the filler and may be installed within the enclosure of the filler.

Another advantage of the present invention is that insertion and welding may be accomplished at the rate of 2500 per hour in each of two parallel filling lines.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENT

Figure 1:
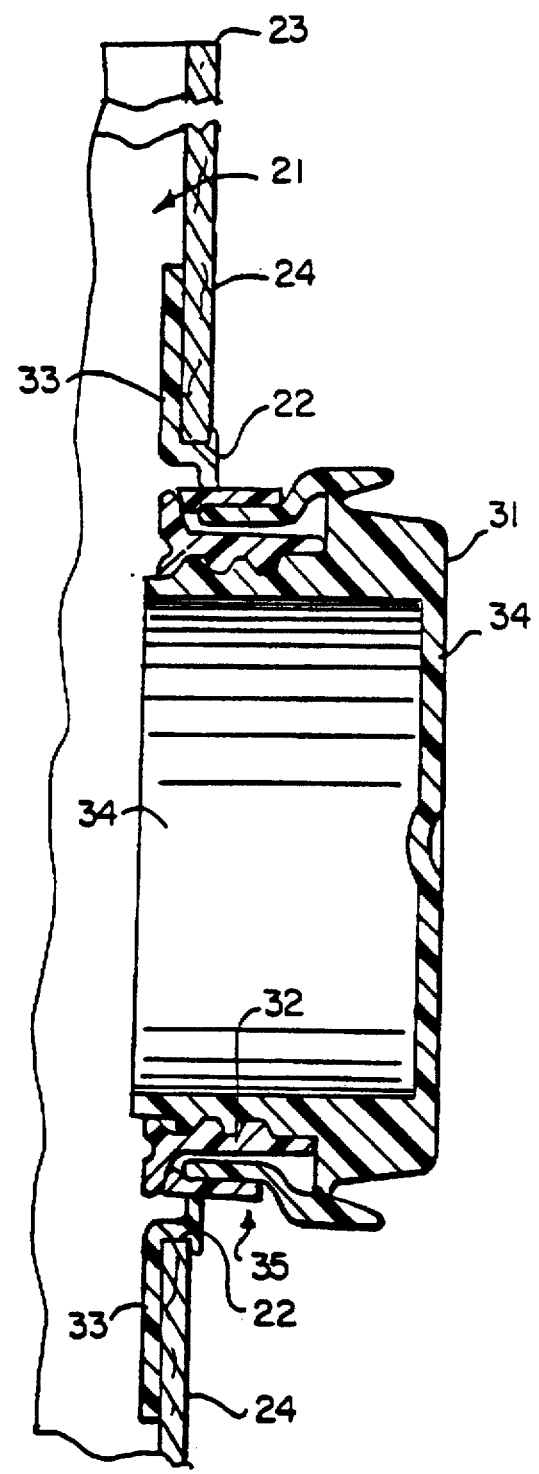
FIG. 1 is an enlarged sectional view through a portion of a carton and a fitment attached thereto.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Components

Carton 21, prior to handling by the apparatus of the present invention, has been erected from a flat blank of coated paperboard into a rectangular tubular shape, and may be closed at the bottom but open at the top 23. Hole 22 is formed spaced downward from upper end 23 of apertured side panel 24. It will be understood that after the fitment 31 has been welded thereto, the carton 21 is transported to a filling station where the carton is filled and the upper end 23 is formed into a conventional tent-like closure, well known in the art. The hole 22 (and the fitment 31 applied thereto by the apparatus of the present invention) are located on one of the sloping portions of the completed carton.

Fitment 31 is formed of a thermoplastic material and comprises a spout 32 having a peripheral flange 33 at one end and a closure 34 at the opposite end. The fitment 31 is subject to considerable variation and may have tamper evidencing means incorporated therein. Suitable fitments are illustrated and described in assignee's U.S. Pat. Nos. 5,174,465 and 5,249,695. Other fitments may be used.

Figure 2:
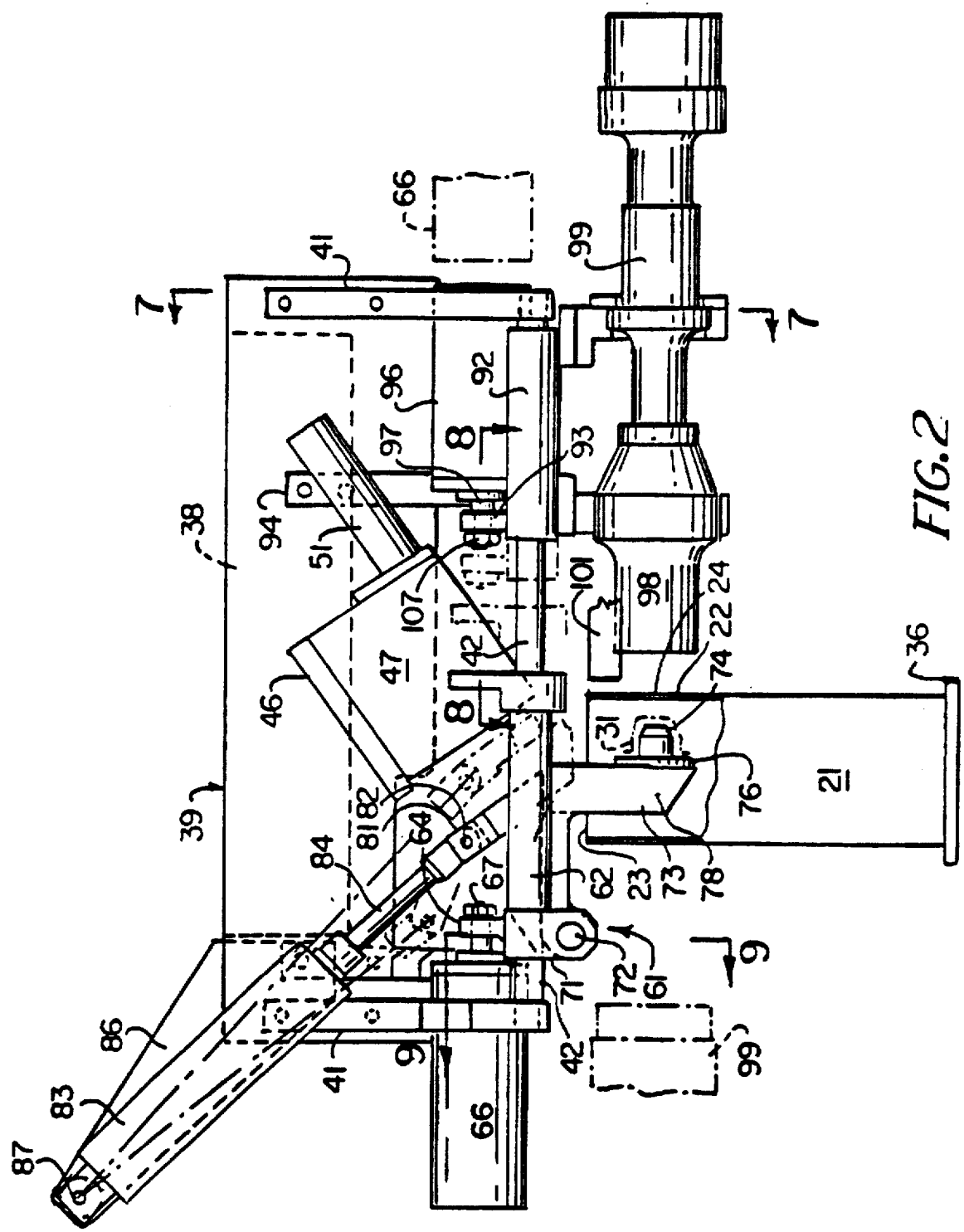
FIG. 2 is a side elevational view thereof.

As heretofore mentioned, the present invention is installed in a paperboard carton filling line such as TETRA-PAK® TR6, wherein a horizontal conveyor 36 of well known construction advances cartons 21 intermittently in a longitudinal direction transverse to the plane in which FIG. 2 is taken. A horizontal transverse cross beam 37 is an integral part of such a filling machine. The apparatus of the present invention is attached to the beam 37 by means of an angle 38 to which a vertical transverse plate 39 is connected. The apparatus extends longitudinally a distance less than the longitudinal conveyor advance and transversely within the enclosure of the filler (not shown). Extending forwardly from plate 39 are brackets 41 which support two horizontal transverse rods 42 which function as ways along which other parts of the apparatus, as hereinafter explained, reciprocate.

Figure 4:
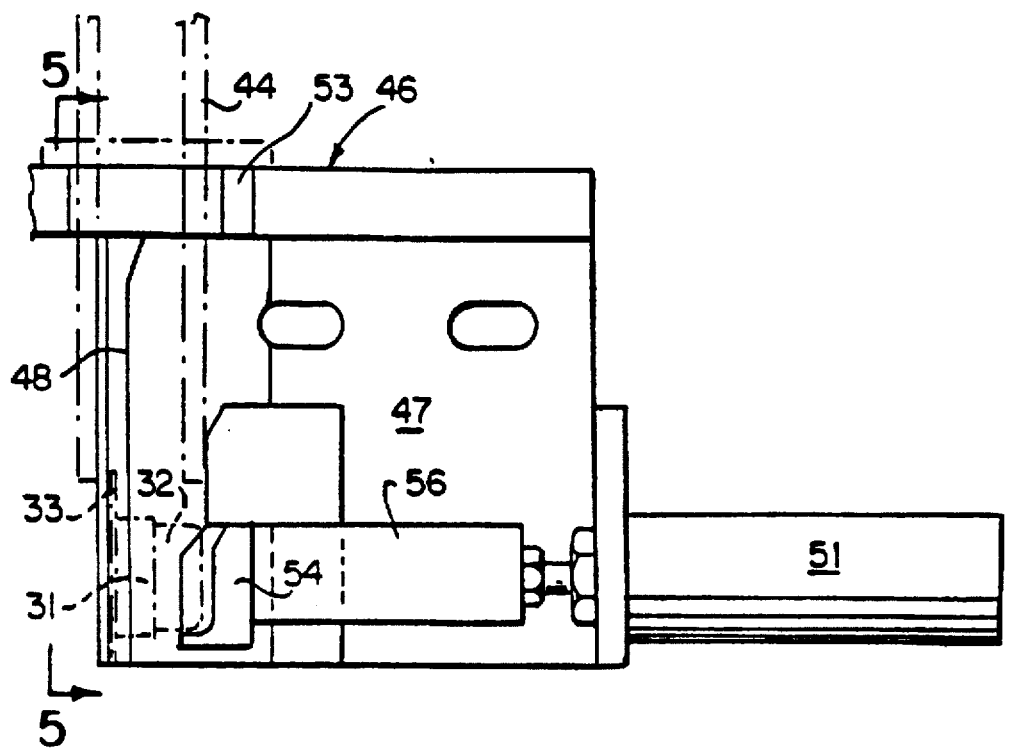
FIG. 4 is a vertical sectional view through the fitment conveyor terminus.
Figure 5:
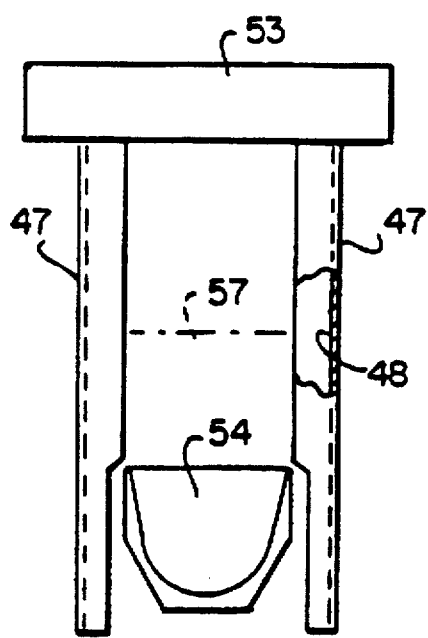
FIG. 5 is a sectional view taken substantially along the line 5—5 of FIG. 4.

A wire fitment chute conveyor 44 conveys fitments 31 from a superimposed hopper (not shown) to a conveyor discharge box or terminus, 46 shown particularly in FIGS. 4 and 5. Box 46 has an apertured top 53 through which the fitments pass. Depending from top 53 are sides 47. On the forward edges of sides 47 are grooves 48 which receive the peripheral flanges 33 of the fitments 31 received within the box 46. As is particularly shown in FIG. 5, the sides 47 narrow down at their lower ends so that the flange 33 is disengaged from the groove 48 but the spout 32 is received in a specially shaped receptor 54 attached to a square guide rod 56 which reciprocates in a bracket 57 inside box 46. Mounted on the box 46 in alignment with rod 56 is air cylinder 51, the plunger 52 of which is positioned to push the rod 56 to the left as shown in FIG. 4, thereby pushing the fitment 31 out of the box 46 for a purpose hereinafter explained. As one fitment is fed out of the box, the next moves by gravity into contact with receptor 54. When receptor 54 is retracted, the next fitment is in position to be advanced in the next cycle of the apparatus.

First carriage or slide 61 is mounted on the left side of the apparatus as viewed in FIG. 2. A pair of sleeves 62 carrying bearings 63 reciprocate on rods 42. Projecting upward from carriage 61 is an ear 64 which is attached to the rod 67 of double-acting horizontal air cylinder 66. Accordingly, as cylinder 66 is energized, carriage 61 reciprocates on rods 42.

Figure 9:
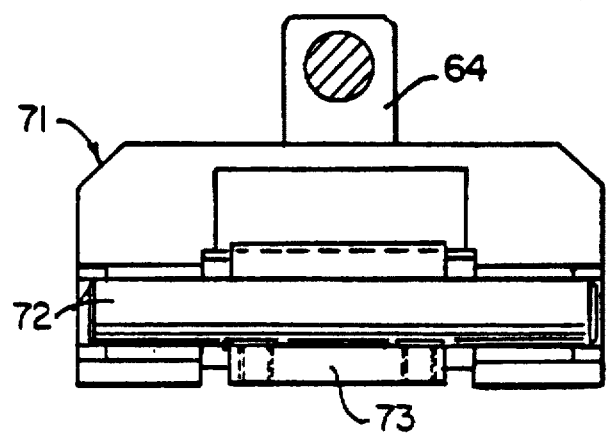
FIG. 9 is an enlarged sectional view taken substantially along the line 9—9 of FIG. 2.

As shown in FIG. 9, cylinder 66 is connected to ear 64 and connected by clevis pin 72 to the first end 77 of L-shaped anvil arm 73. The second end 78 of arm 73 carries at its outer end spud or anvil 74 onto which the fitment 31 is deposited from the receptor 54 when the arm 73 is in its upper position (dotted lines as shown in FIG. 2). Surrounding the inner end of spud 74 is a weld backup support 76 which engages the outside of flange 33 of fitment 31.

Arm 73 is caused to oscillate as shown in FIG. 2. Arm clevis 81 is attached to arm 73. The opposite end of clevis 81 is attached by pin 82 to the rod 84 of cylinder 83. The upper end of cylinder 83 is attached to bracket 86 fixed to plate 39 by means of pivot pin 87.

Actuation of cylinder 83 causes the arm 73 to pivot about pivot 72 on first carriage 61 from the solid line vertical position shown in FIG. 2 to position slanted upward 35° to pick up a fitment 31 from receptor 54 which is slanted down 35° and then return to vertical position shown in solid lines in FIG. 2. This causes the fitment 31 to be deposited inside the open end of carton in alignment with hole 22 as the carton is moved along the conveyor 36 to the fitment attachment station to receive the fitment 31. Shock absorbers 111 on clevis 81 engage carriage 61 to limit and cushion movement of arm 73 to downward, vertical position. Thereupon cylinder 66 is actuated, causing the first carriage 61 to move from the solid line position shown in FIG. 2 to the right to move the fitment 31 to the right so that closure 34 thereof projects through the hole 22 in the panel 24 and flange 33 engages the inside of panel 24.

Second carriage 91 is mounted on the right hand side of the apparatus as viewed in FIG. 2. Carriage 91 has a pair of sleeves 92 containing sleeve bearings 95 which slide along the rods 42. Carriage 91 has an upward projecting ear 93 which is attached to the outer end of rod 97 of pneumatic cylinder 96 fixed to plate 94 which is attached to plate 39. Carriage 61 carries upward extending abutments which are engaged by adjustable stops on second carriage 91 fixed to support 94 to limit movement of the carriages toward each other. Depending from carriage 91 and fixed thereto is an ultrasonic welding horn 98 and horn actuator 97. Also fixed to carriage 91 is a carton locator 101 consisting of horizontally extending arms. As the second carriage 92 is moved to the left as viewed in FIG. 2, the carton locator 101 engages the outsides of carton 21 and positions it vertically upright.

Figure 10:
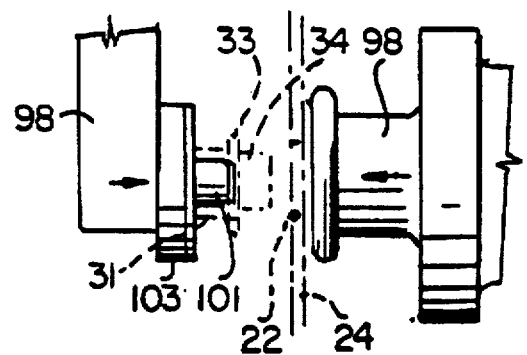
FIG. 10 is an enlarged elevational view showing assembly of the fitment in the carton.
Figure 11:
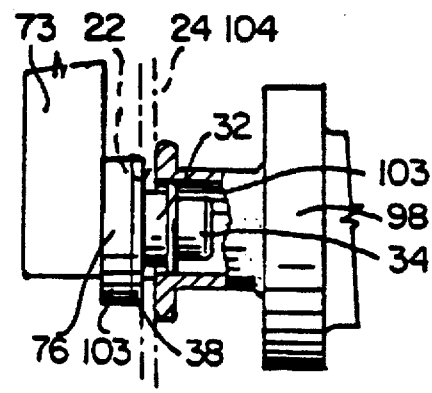
FIG. 11 is a view similar to FIG. 10 partly broken away in section to show the welding operation.

Directing attention now to FIGS. 10 and 11, the fitment 31 is deposited through the open top of carton 24 so that it is horizontally aligned with the hole 22 in the wall of panel 24. Advancement of the first carriage 61 pushes the fitment 31 from the position of FIG. 10 to the position of FIG. 11 where the flange 33 engages the inside of panel 24 and the closure 34 projects out through the hole 22. Horn 98 is formed with a hollow 103 shaped to receive the spout 32 as shown in FIG. 11. Circular welding area 104 of horn 98 engages the outside of panel 24 opposite flange 33. Thus the carton is clamped between weld backup 76 and welding area 104. Actuation of the horn 98 thereby welds the fitment to the carton.

Operation

Figure 12:
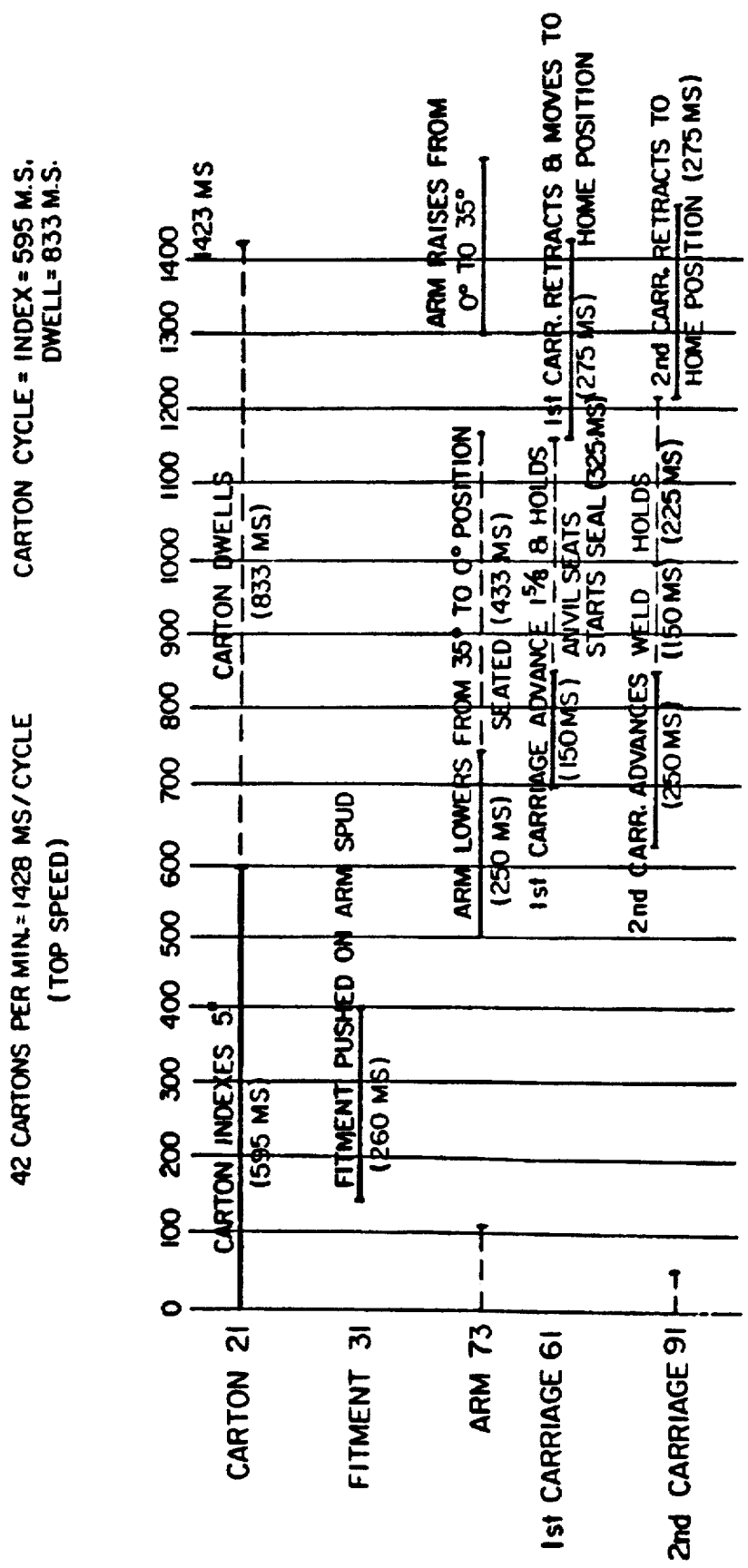
FIG. 12 is a timing diagram for the apparatus.

Referring to FIG. 12, the apparatus heretofore described can apply fitments to approximately 42 cartons per minute. At such speed, the carton indexes or moves forward 595 milliseconds and dwells 833 milliseconds. It will be understood that other speeds and ratios of indexing to dwell may be employed.

At the commencement of the cycle, the conveyor 36 moves forwardly a distance of approximately five inches during which time the carton to which a fitment has already been applied is moved forwardly toward the fill station while a new carton is moved into position. During this movement, arm 73 is in its upward position with end 73 slanted upwardly 35° to the horizontal and spud 74 in proximity to the fitment discharge box 46. First carriage 61 is retracted (toward the left as viewed in FIG. 2) and second carriage 91 is also retracted (toward the right as viewed in FIG. 2). While the carton is moving, cylinder 51 is energized so that receptor 54 pushes fitment 31 from box 46 onto spud 74. Just as the carton reaches its dwell position, cylinder 83 is energized to lower arm 73 from its initial position to a position where the end 77 extends vertically-downwardly. During this movement the fitment 31 and spud 74 enter the open top of carton 21 and the fitment 31 is horizontally aligned with the hole 22 in carton 21. Second carriage 91 and then first carriage 61 advance under influence of cylinders 96 and 66, respectively. Movement of carriage 61 causes the closure 34 to protrude through hole 22 and flange 33 to engage the inside of panel 24. Movement of carriage 91 causes the circular welding area 104 to engage the outside of the panel 24, clamping the parts together. The horn actuator 96 is energized causing the horn 98 to weld flange 33 to panel 24 and then to hold to complete the weld. Reverse operations of cylinders 66, 96 and 83 thereupon causes first carriage 61 and second carriage 91 to retract to original positions and arm 73 to retract to initial position so that on the next cycle another fitment may be applied to spud 74. The cycle of operations is repeated.

Figure 3:
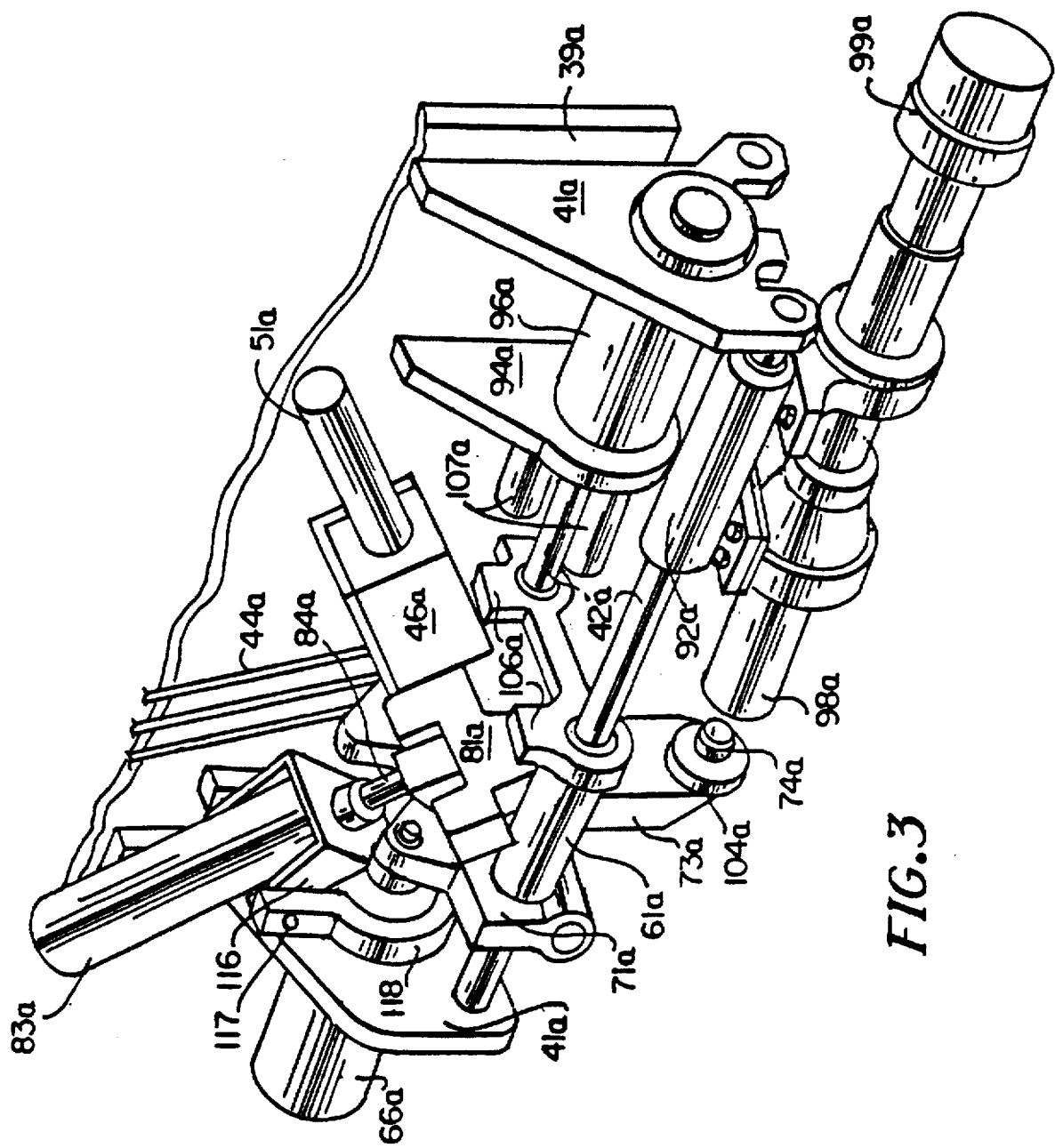
FIG. 3 is a schematic perspective view of a modified apparatus.
Figure 6:
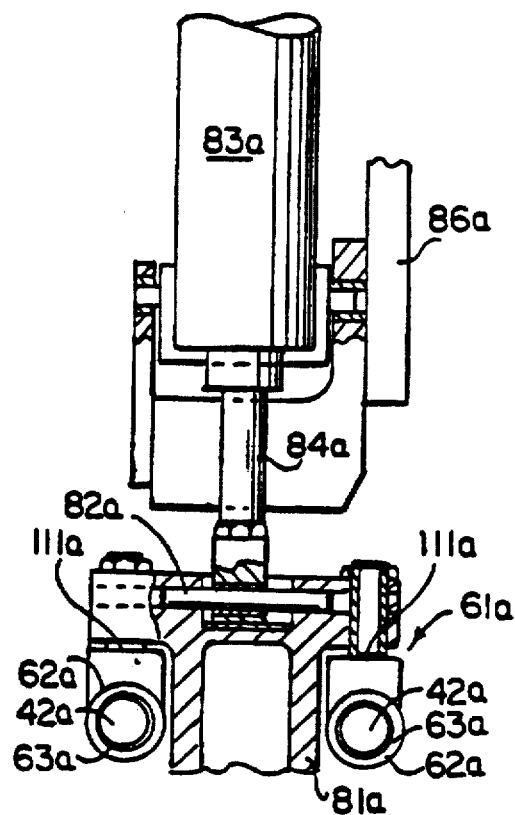
FIG. 6 is a sectional view of a portion of the modification of FIG. 3.
Figure 7:
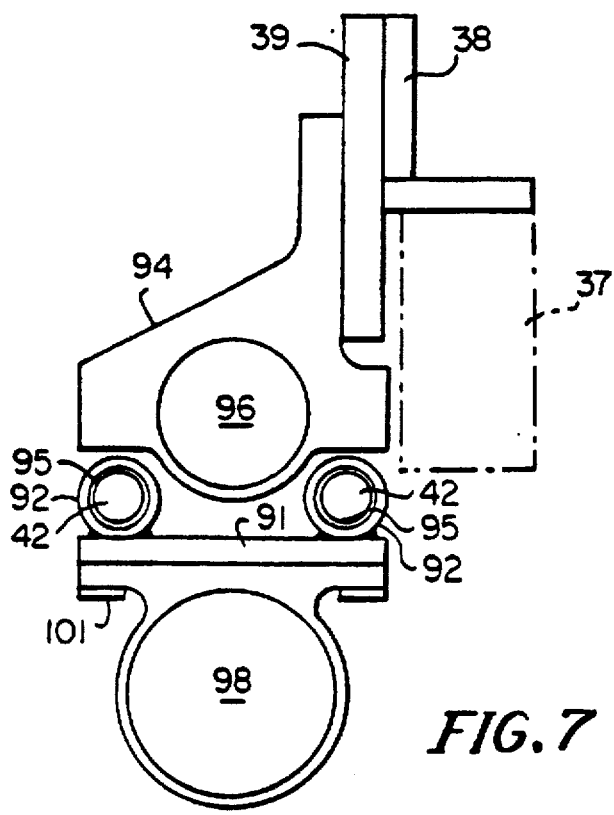
FIG. 7 is a sectional view taken substantially along the line 7—7 of FIG. 2.
Figure 8:
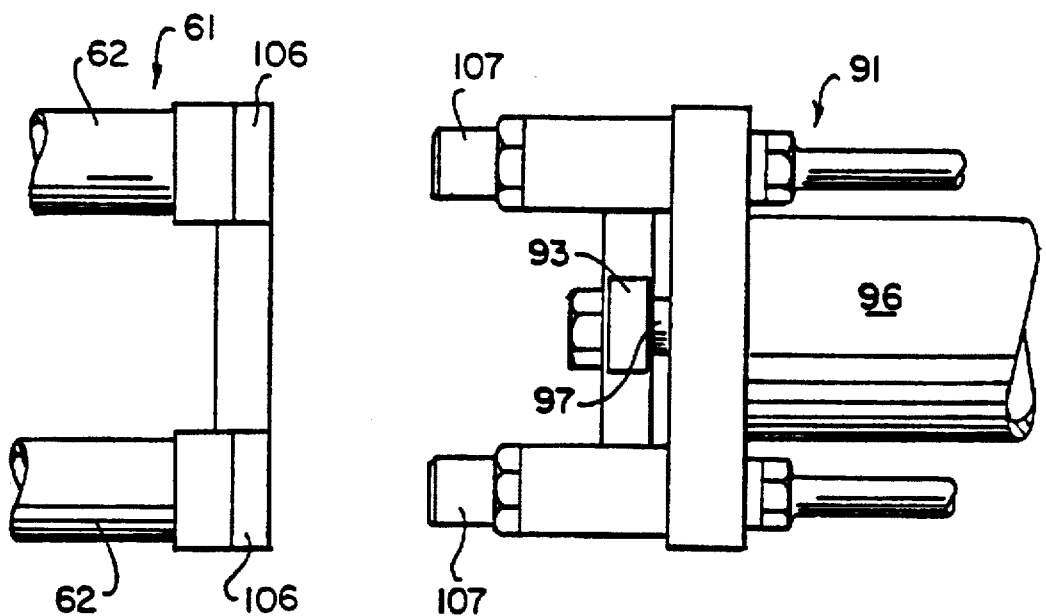
FIG. 8 is a fragmentary sectional view taken substantially along the line 8—8 of FIG. 2.

FIGS. 3 and 6 illustrate a modification. Cylinder 83a is received in a U-shaped bracket 116 which is attached by pivot pins 117 to yoke 118 fixed to one of the brackets 41a. Rod 84a is attached by pin 82a to arm 81a. In other respects the modification of FIGS. 3 and 6 resembles the preceding modification and the same reference numerals followed by subscript a are used to designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for attaching a fitment to a vertical carton positioned on a conveyor wherein each said carton comprises a rectangular tube having a wall and an open upper end, the wall being formed with a hole and wherein said fitment comprises a spout smaller than the hole and a peripheral flange at one end of said spout larger than the hole, said method comprising the steps of moving a carton horizontally along a path substantially parallel to a first substantially vertical plane to a fitment application position, positioning the carton stationary in said fitment application position with the open end exposed, moving an arm substantially parallel to a second substantially vertical plane transverse to said first plane to a first arm position, said arm having a spud, applying a fitment to said spud while said arm is in first arm position, moving said arm substantially parallel to said second plane to a second arm position with said spud and a fitment on said spud inside said carton and said fitment aligned with said hole, moving said spud substantially parallel to said second plane from a first spud retracted position to a first spud advanced position and thereby moving the fitment laterally so that the spout protrudes out through the hole and said flange engages the inside of the wall.

2. A method according to claim 1 which further comprises moving an annular welding head substantially horizontally substantially parallel to said second plane from a welding head retracted position to a welding head projected position to engage a wall of the tube and surrounding the hole, the spout fitting inside said welding head, clamping the wall and the peripheral flange between said welding head and said spud, and welding the flange to the wall.

3. A method according to claim 2 further comprising feeding the carton into said fitment application stage and retaining the carton stationary until said welding step is completed.

4. A method according to claim 2 in which said horn is horizontally aligned with said spud when said arm is in second arm position.

5. A method according to claim 2 which further comprises providing a discharge box for fitments and a track for fitments leading to said box, said box being adjacent said spud when said arm is in first arm position and which further comprises, placing fitments in said box, and moving one fitment at a time from said box onto said spud.

6. Apparatus for attaching a fitment to a carton wherein said fitment comprises a spout and a peripheral flange adjacent an end of said spout and said carton has an open top and a wall formed with an aperture and wherein said apparatus comprises a conveyor arranged to advance a vertical carton substantially horizontally parallel to a first substantially vertical plane to a fitment applying station and a base mountable on a filler machine at said fitment applying station, the improvement comprising means for moving an arm mounted on said base substantially parallel to a second substantially vertical plane transverse to said first substantially vertical plane, a spud on a distal end of said arm, said arm clearing said top when at said fitment applying station, means for moving said arm to move said spud between an applying position at the level of said aperture and an upwardly-outwardly slanted loading position, a fitment discharge above said base receiving fitments from a source and positioning fitments to be transferred one at a time onto said spud when said spud is in loading position, said arm having a retracted position with said spud in applying position inside said carton and an advanced position with said spout extending through said aperture and said flange against the inside of said wall.

7. Apparatus according to claim 6 in which when said arm is in applying position said arm extends upwardly-outwardly to a level above said top and then downwardly-outwardly so that said spud is inside said carton.

8. Apparatus according to claim 6 in which further comprises mounting means for said arm located above and transverse to the path of movement of cartons on said conveyor.

9. Apparatus according to claim 8 in which said mounting means comprises a shaft, said arm being pivoted to a carriage sliding along said shaft.

10. Apparatus according to claim 9 which further comprises a second shaft substantially vertically aligned with said first shaft, said carriage mounted on said second shaft.

11. Apparatus according to claim 6 in which said means for moving said arm comprises an oscillating cylinder, a rod for said cylinder, and a link pivoted at one end to said rod and pivoted at another end to said arm.

12. Apparatus according to claim 6 which further comprises a track for fitments to convey said fitments to said fitment discharge and means for removing one fitment at a time from said box and engaging said one fitment on said spud.

13. Apparatus according to claim 6 in which said spud has a boss shaped to fit inside said first end of said spout and said arm has an anvil flange shaped to fit against a surface of said fitment flange.

14. For use in apparatus for attaching a fitment to a vertical carton, said fitment having a spout and a peripheral flange adjacent an end of said spout and said carton having an open top and a wall formed with an aperture and wherein said apparatus has a base mountable on a filler machine at said fitment applying station and wherein the vertical carton advances along a conveyor substantially parallel to a first substantially vertical plane, a fitment handling mechanism comprising, a carriage, mounting means for mounting said carriage on said base for reciprocation transverse to the path of movement of said carton on a conveyor substantially horizontal parallel to a second substantially vertical plane transverse to said first plane, reciprocating means for reciprocating said carriage for movement substantially parallel to said second plane, an arm, pivot means pivoting said arm to said carriage for movement substantially parallel to said second plane, a spud on a distal end of said arm, said arm extending upwardly and distally of said pivot means to clear the top of the carton when at said fitment applying station, oscillating means oscillating said arm to move said spud between an applying position at the level of the aperture and an upwardly-outwardly slanted loading position.

15. Mechanism according to claim 14 which further comprises said oscillating means comprising a double acting cylinder attached to said arm.

* * * * *